United States Patent [19]
Krummel

[11] Patent Number: 5,557,091
[45] Date of Patent: Sep. 17, 1996

[54] METHOD AND SYSTEM FOR BAR CODE IMAGE PROCESSING

[76] Inventor: Larry Krummel, 13750 Serraoaks, Saratoga, Calif. 95070

[21] Appl. No.: 228,032

[22] Filed: Apr. 15, 1994

[51] Int. Cl.⁶ .................................................. G06K 7/10
[52] U.S. Cl. ........................................ 235/462; 235/463
[58] Field of Search .................................... 235/462, 463

[56] References Cited

U.S. PATENT DOCUMENTS

| | | | |
|---|---|---|---|
| 4,873,426 | 10/1989 | Sarna et al. | 235/462 |
| 4,879,456 | 11/1989 | Cherry et al. | 235/463 |
| 4,988,852 | 1/1991 | Krishnan | 235/462 |
| 5,120,940 | 6/1992 | Willsie | 235/462 |
| 5,134,272 | 7/1992 | Tsuchiya et al. | 235/462 |
| 5,155,343 | 10/1992 | Chandler et al. | 235/462 |
| 5,276,315 | 1/1994 | Surka | 235/462 |
| 5,343,028 | 8/1994 | Figarella et al. | 235/462 |

OTHER PUBLICATIONS

"An Experimental Page Layout Recognition System for Office Document Automatic Classification: An Integrated Approach for Inductive Generalized," by Floriana Esposito et al., IEEE, 1990.

USS—Uniform Symbology Specification—93; published by Automatic Identification Manufacturers, Inc., copyright 1986.

*Primary Examiner*—Donald T. Hajec
*Assistant Examiner*—Mark Tremblay
*Attorney, Agent, or Firm*—Haynes & Davis

[57] ABSTRACT

Disclosed is a method and apparatus for discerning the presence of one or more bar codes within the image of a scanned document and making the bar code data available to a document image management system. The scanned image is represented by a bit map which is searched for data blocks, such having been formed by a smearing technique. Each data block is analyzed to find bar code candidates which are then subjected to a dynamic width determination process so that an attempt to read them as a bar code can be made.

13 Claims, 8 Drawing Sheets

METHOD AND SYSTEM FOR BAR CODE IMAGE PROCESSING

FIELD OF THE INVENTION

The present invention relates to bar code processing and more particularly relates to digital processing of bar code bit maps scanned from documents having bar codes thereon.

BACKGROUND OF THE INVENTION

In document processing, the use of bar codes on documents to identify and index documents is becoming wide spread. Industries such as insurance, package shipping, health care and litigation require documents to be identified, categorized and routed to their appropriate destinations.

Bar codes are designed to be read by computers. A bar code is a self-contained message whose information is encoded in the widths or relative widths of its printed bars and spaces. When a bar code is read, the patterns of light and dark contained in the bars and spaces are translated into patterns of ones and zeros which the computer interprets as numeric or alphanumeric data. Imaging automation by an image scanner which converts a document's image, including its bar code, into a bit map can make high volume document processing more time efficient and cost effective. High volume document imaging systems are routinely called upon to efficiently capture, store, manipulate, and retrieve hundreds of millions of document images.

Processing documents to identify or categorize them is a much more difficult problem than to process documents which have been pre-sorted. In processing documents to identify them, any type of document might be feed into a scanner. One or more bar codes therefore might be positioned in any number of locations on a document page. Thus, in order to read the bar code, the information on the document must be analyzed in order to locate the bar code. Current systems however, have limited facility to discriminate between text or other information on a page and a bar code in order to locate bar codes.

In processing documents which use more than one type of bar code, the ability to distinguish between types of bar codes in order to read them is necessary. Corrections to the bar code bit map data may be required prior to reading to correct, for example, skewing of the bar code. Moreover, if there is a loss of symbol data due to poor print quality, copying or faxing, bar and space width corrections need to be made before reading.

Document processing by imaging requires automatic reading from a largely uncontrolled input, i.e. the image of a page. Although systems currently used employ high-speed scanning hardware, they lack the adaptability to read bar codes which are not positioned in a routine location on a page or routine element widths. Moreover current bar code imaging systems often fail to read bar codes which are either skewed on a page or when a page is fed into the scanner at an angle.

SUMMARY OF THE INVENTION

According to the document image capture method and system of the present invention, one or more randomly positioned and/or oriented bar codes on a document are located and read. To locate the bar code, a document is scanned to generate a bit map which is sent to a computer. The bit map is searched for data blocks which are candidates for bar codes, the data blocks having been formed by a smearing technique. The smearing of the image will cause closely related data, that is pixels which are close to touching or are touching their neighbors, to form into data blocks. The image is processed in accordance with the present invention to determine the content of each unique object, that is, pixels of a single set touching no other pixels. For example, the size (extent) of each data block is measured to find candidates. "Data block" and "block" are used interchangeably herein. Each data block is then compared with predetermined bar code size criteria to determine which data blocks are bar code candidates. The candidates are then sent through a dynamic width determination process so that an attempt to read them as a bar code can be made.

DETAILED DESCRIPTION OF THE INVENTION

Figure 1:
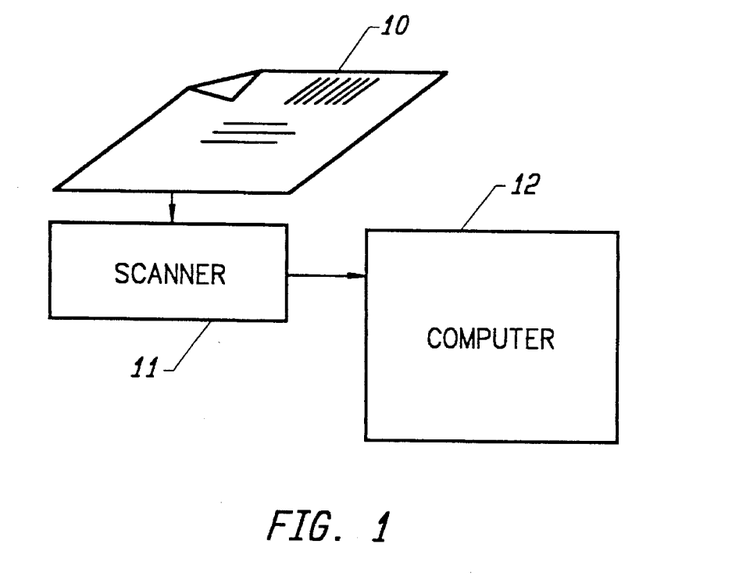
FIG. 1 is a functional diagram of a system of the present invention.

A detailed description of the preferred embodiment of the present invention is provided with reference to the figures. With reference to the figures, the organization of invention elements for discerning the presence of one or more bar codes within the image of a scanned document and making the data contained within the bar code (the bar code's message) available to a document image management system is provided. FIG. 1 shows a functional diagram of a system of the present invention having an example of a document 10 with text or other matter, such including a bar code in an unspecified location. A typical scanned document is made up of text having varying spaces therebetween, logos, photographs and other types of information, as well as the possibility of a bar code. According to the present invention, the search process is looking for bar codes which may or may not be present on the scanned document.

The document is scanned by scanner 11 and a bit map or pixel representation of the document is generated. The bit map is sent to computer 12 through a scanner interface, disk or other means of data transmission (not shown). The computer includes memory, microprocessors and programs with which to manipulate the bit map and/or data generated therefrom according to the present invention. The scanning, bit mapping, transmission and bit detecting characteristics of the present invention are well known in the art.

Figure 2:
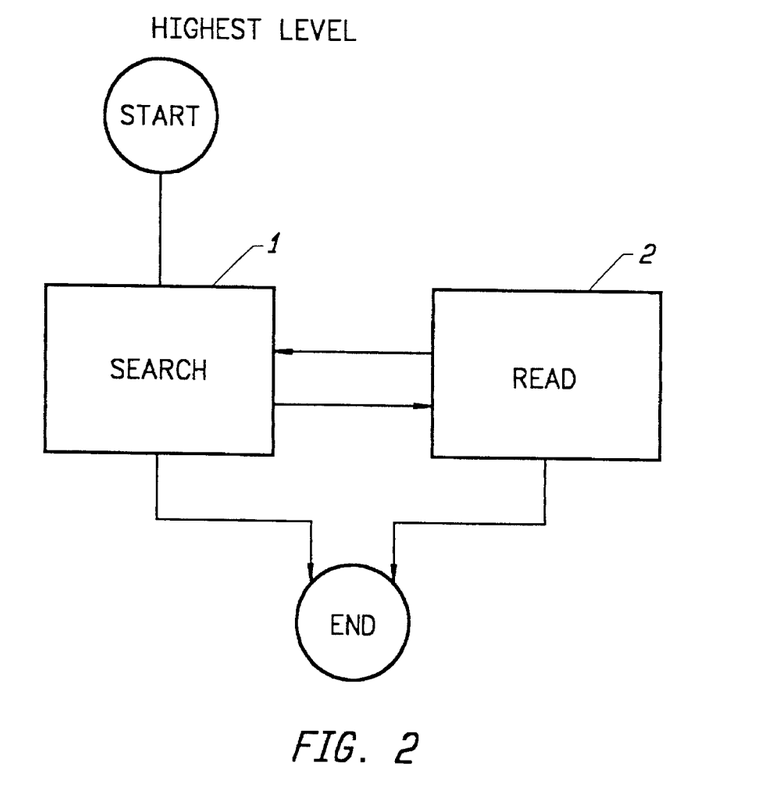
FIG. 2 is a very high level flow chart diagram of the present invention.

During processing by the computer, a bit map is manipulated to provide the identification of a document according a bar code. As shown by the block diagram of FIG. 2, present invention includes cooperating search and read components. The bit map is first searched at step 1 and if any bar code candidates are found, the candidates are processed through a read system at step 2. In the process, the bit map may be searched again and read again (according to certain size parameters as discussed below) until all possibilities of finding a bar code are virtually exhausted.

Figure 3:
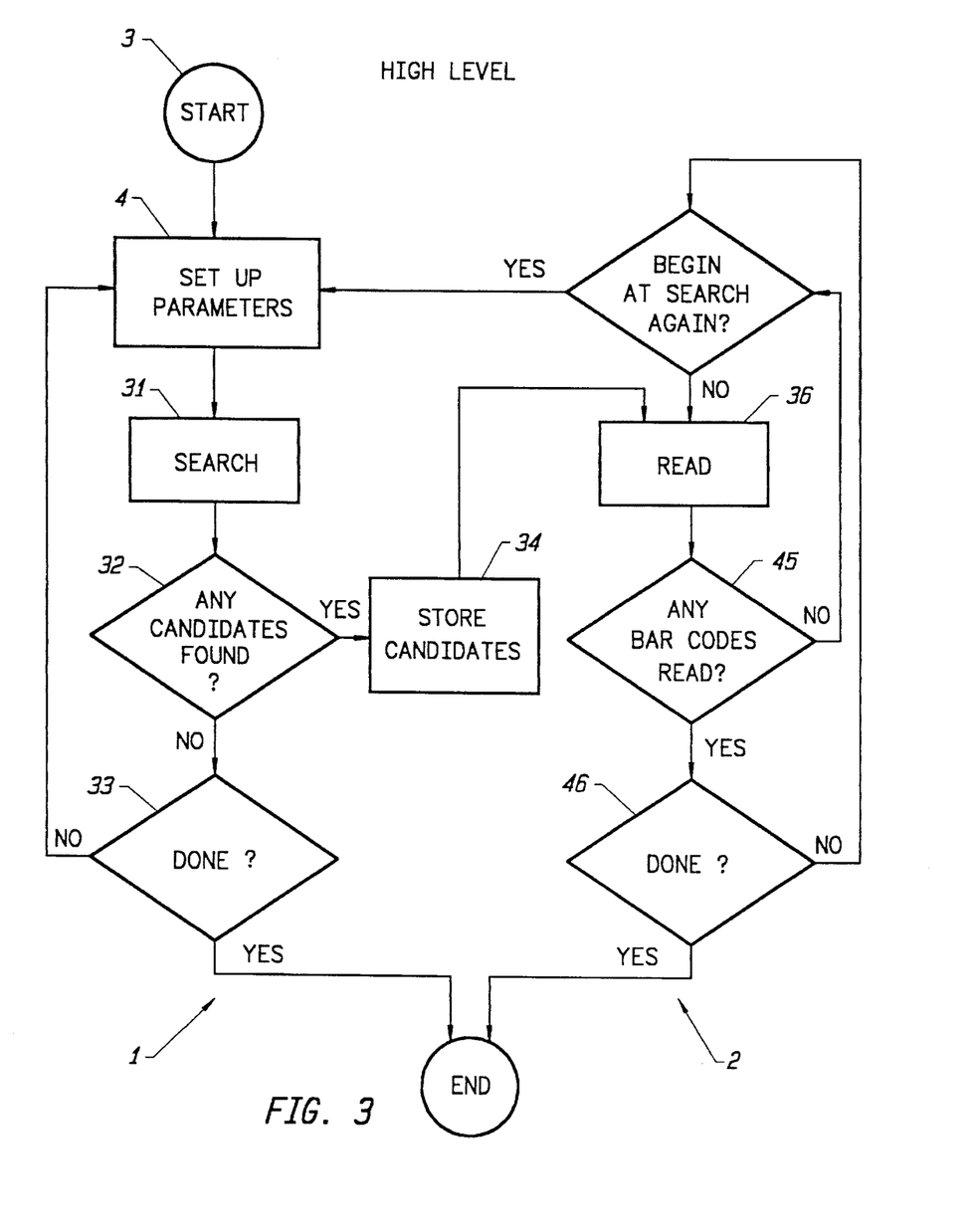
FIG. 3 is a high level flow chart diagram of the present invention.

Briefly turning to FIG. 3, the left side of the flow chart is generally the searching process 1 and the right side is generally the reading process 2 of the present invention. In searching, there are several inherent searching difficulties which the present invention addresses. First, there may be many bar codes on a single page of text. The bar codes may be side by side and may very well be skewed and in different directions. After the start 3, parameters are set up at step 4. Searching parameters include those provided by the user and default settings. The user could provide the types of bar codes which are expected to be on the documents processed in order to narrow down the number of different types of bar codes searched for and attempted readings processed by the present invention. The present invention also includes the capability of searching according to the standards for all the different types of bar codes as a default setting.

Once the bit map has been generated and enhanced by the computer by well known methods, a search of the document is made looking for bar code candidates. A bar code is defined by the widths or relative widths of its black bars and white spaces. In the present discussion, the term "white spaces" is the same as white pixel run length and the term "black bar" is the same as black pixel run length, such terms being used interchangeably herein. The actual number of black or white pixels which constitute the width or relative width of bar or space can be different within a single symbology because of scanning errors, printing error or even paper size changes. The number of bars and spaces used is particular to each bar code symbology.

Figure 4:
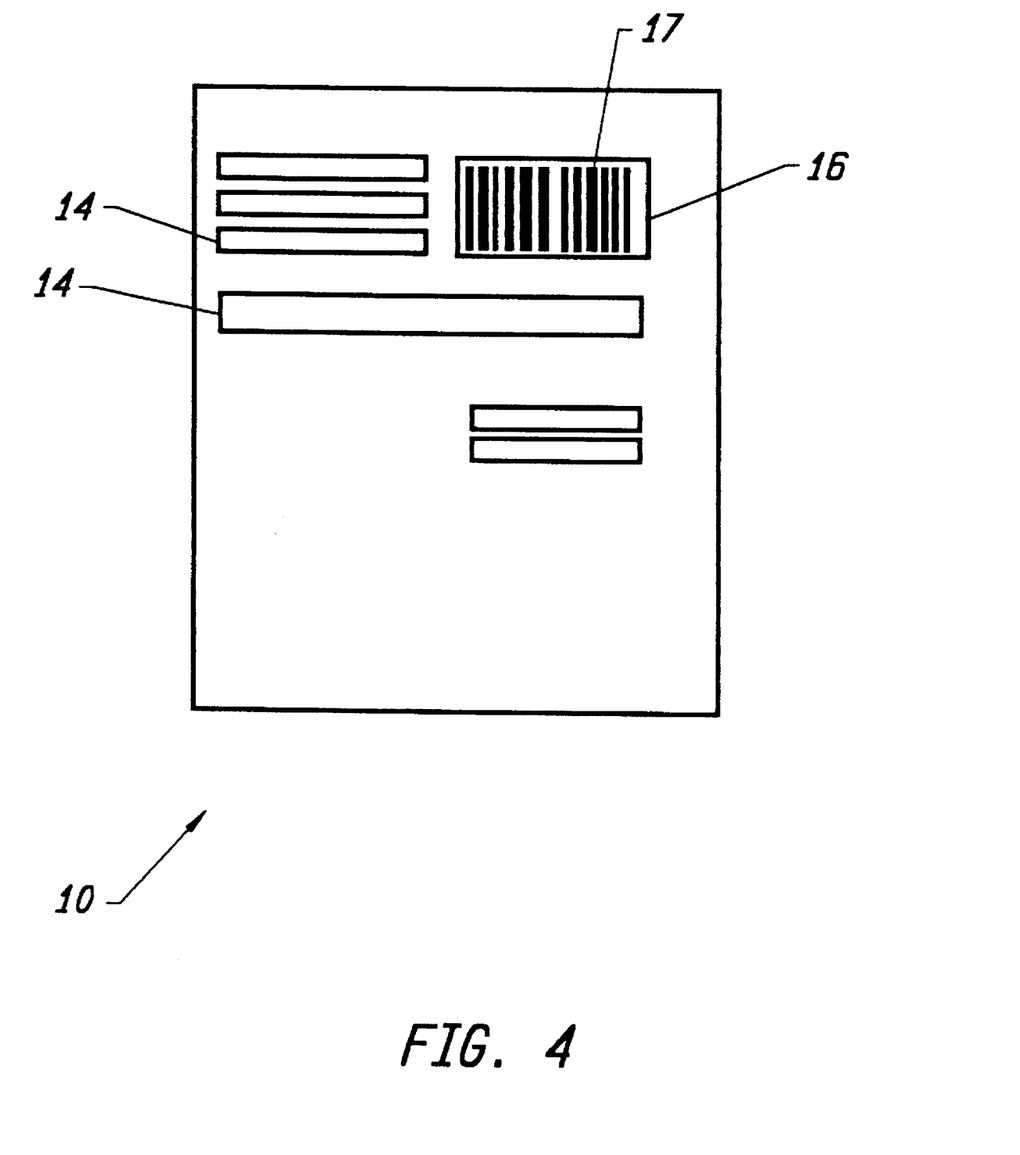
FIG. 4 depicts a document having blocks defined by smearing technique.

Referring to FIG. 4, a document 10 is shown in more detail such depicting a document having data blocks defined by a smearing technique of the present invention. Prior to smearing, the document will most likely be made up of alpha-numeric characters in varying sizes, some logos, some pictures or photographs, and possibly a bar code. In performing the smearing operation, the geometric characteristics of the document's layout components (height, width, spacing, alignment, etc.) are analyzed. The smearing of particular data bits or segments into certain data blocks is accomplished by taking into account certain features, in particular the symbology, size and number of characters. The use of these parameters permits calculation of the estimated maximum white pixel run lengths within a code. The complete input image is "smeared" using the estimated maximum white pixel run length. Image smear is simply converting white pixels of run lengths less than some number to black pixels. The affixed is filled regions of black on a bit map which define objects of known proximity. In this manner, the present invention uses a generalized object search method for detecting and processing arbitrary objects in a document page, for example, the detection of headlines, line art, photos and paragraphs. Lines of text are generally long, thin rectangles 14 and headlines are much larger.

Once the document has been blocked, the bar code can be recognized by determining which if any of the blocks are eligible to be a bar code. In FIG. 4, for example, block 16 has been identified as containing a bar code 17. A sample bar code is shown in FIG. 5 and has several important characteristics, some of which will be discussed in more detail below.

Smearing according to the present invention fills in the white spaces of a copy of the bit map (a copy of that one transmitted to the computer) according to which type of bar code is expected to be found. If the user inputs that 3 of 9 or Code 39 is expected, the program according to the present invention knows that the maximum white space to be filled in is just larger than the largest white space between two bars of the these bar codes. In other words, any space less than the maximum white space will be filled in by black bits. Thus certain portions of the document will contain data blocks 14 and 16 similar to those on FIG. 4.

Figure 6:
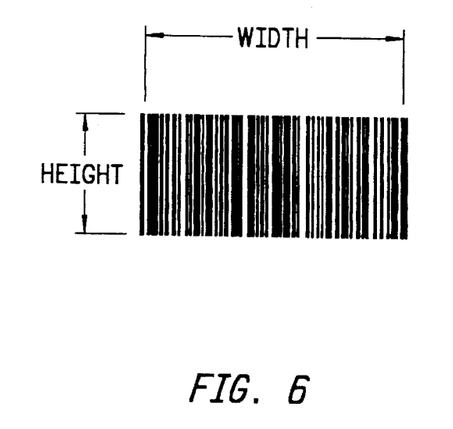
FIG. 6 and 7 shows height and width dimensional criteria.

As mentioned above, in a document imaging environment, bar code symbols can not always be affixed to a document so that they are read in the normal left to right orientation. Additionally documents are not always loaded into the scanner in their normal reading orientation. Quickly turning to FIGS. 6 and 7, regardless of orientation, the height of a bar code symbol is always measured by the length of its bars, and its width is always measured perpendicular to its bars.

Figure 5:
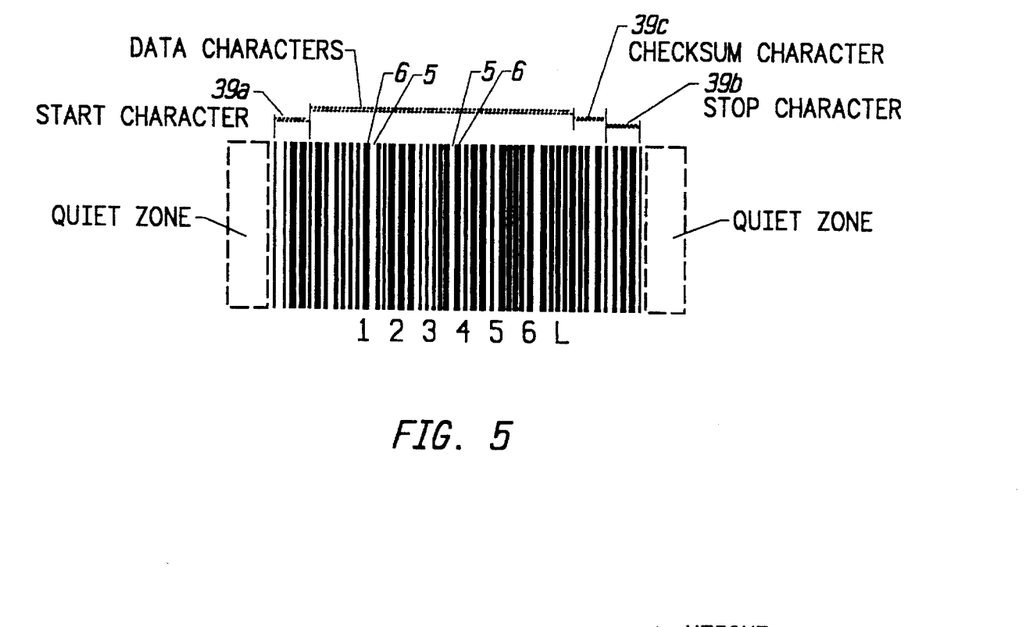
FIG. 5 depicts a bar code and its components.

Turning to FIG. 5, the bar code shows white spaces 5 and black bars 6. In the bit map, a certain number of bits will make up the largest possible white space for a particular bit map. Referring to both FIGS. 3 and 8, step 4 for setting up the parameters is shown, such parameters including features as shown in FIG. 5, including height and width of the bar code itself, the existence of a checksum and start and stop characters and number of characters. Parameters for the search are generated from input at step 4'. The required run-length for each smear can be calculated from the input parameters at step 4". Also, the maximum white space to be filled in can be calculated at step 4''' wherein the maximum run length must account for the possibility of skew.

Figure 7:
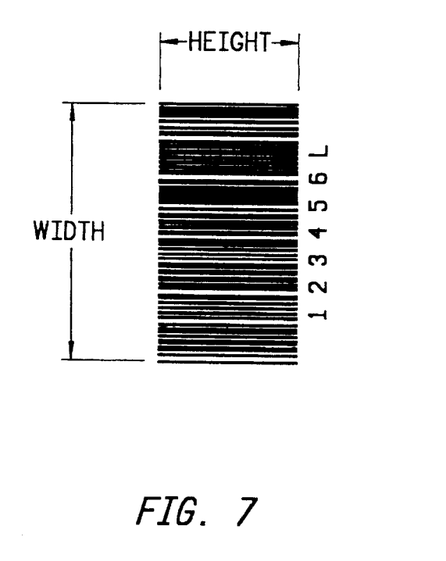

As mentioned above, the orientations shown in FIGS. 6 and 7 are referred to as horizontal and vertical respectively and represent the maximum values in either the horizontal direction or the vertical direction a bar code block can possess. The size and number of characters and bar code types are used to define the relative distance between bars. Examining however, an individual white space 5, in the horizontal direction, has a finite width. In FIG. 7 the white space 5 has an infinite width. Therefore, in order to examine data blocks to select bar code candidates according to size while accounting for skewing, normalization provides that the maximum white space width to be filled in is multiplied by positive and negative 2 over the square root of two, thus accounting for skew up to 45 degrees in either the positive direction or the negative direction. Also, a fudge factor is added to the maximum to account for potential error caused by noise. Each of the black/white transitions in the bit map are processed assuming that is each a bar/space.

Returning to FIG. 8, after step 4''', the bit map is analyzed for white and black pixels in step 8. As discussed above, in step 8' the bit map is smeared by filling in the white pixels when the white pixel run lengths are smaller than the maximum white run length. In step 8" the smeared image is processed for connectivity. The segmentation or connectivity step is performed according to well known methods to generate a list of data blocks. By processing all the image with a maximum white run length based on size and symbol requirements, the list of data blocks is generated without first knowing which is a bar code. The list of data blocks is compared with the list of possible sizes, one size at a time. The search provides candidates with respect to one size at a time so that after each read pass the search process is started again with respect to a different size. Only those data blocks matching the list of possible sizes are kept for future processing. In a practical sense, three standard sizes are used 99% of the time and thus effectively all physical sizes can be analyzed with a minimum number of passes through the search process.

Figure 8:
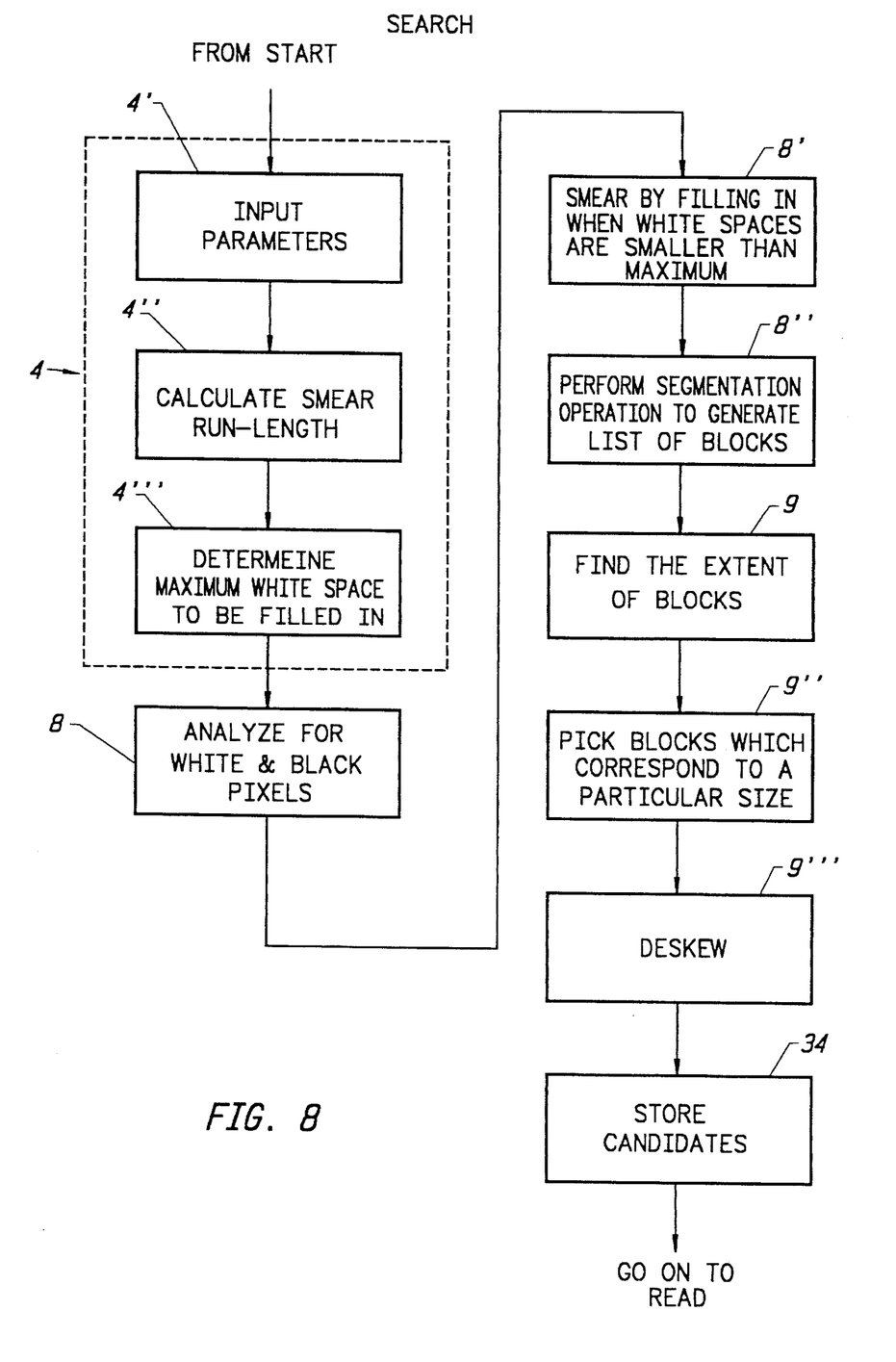
FIG. 8 is a flow chart of the searching process of the present invention.

Each data block in the list is processed to determine its extent. If the bit map data represents skewed text, the actual data extent will be larger than if it were not rotated. It will be compact if it is not skewed. Thus each extreme end of the data block is examined. For example, in a Cartesian coordinate system, the most positive and negative values in both the abscissa and the ordinate are observed for each data block to determine its extent, as shown in FIG. 8 as step 9. Accordingly, since the size of the smeared objects is based on the size of the bar code, a wide range of sizes will cover all expected bar code sizes. The system then compares the list against a predetermined bar code size criteria.

The blocks generated from the scanned document are compared to the standards including the minimum and maximum height and width parameters to determine which blocks are bar code candidates. Generally, ⅜×1" is the smallest block configuration which could be detected according to the bar codes currently in use. In order to reduce search time, when applying the present invention certain size blocks can be eliminated by previous programming and as mentioned above, for efficiency, matches to one bar code size is searched at a single time. Moreover, the subsequent reading process is provided with respect parameters to that particular bar code size. The candidates selected from narrowed down list are deskewed in step 9'''.

Returning to FIG. 3, after step 4 where the parameters are set, this particular searching step 31 just described with respect to FIG. 8, is nearly complete. If no candidates are found as shown by a pass through step 31, at step 32 a decision is based on whether any candidates been found. If a sufficient number of passes have been made through the search step and no candidates have been found, at step 33, the process will end. If the parameters provide that more searches are to be made, the search process will start all over again, repeating the process. Moreover, after the reading step 2 generally shown on the right hand side of FIG. 3, the search step may be revisited. For example, considering different sizes on each pass.

The height of the bar code determines how much skewing can be tolerated without impacting read performance. Simple bar code reading can be performed by scanning a path across the horizontal plane of the image (the vertical plane for vertically oriented bar codes). Depending upon the skew of the bar code 17, the bar code may be able to be read without adjustment or the bar code may need adjustment. If only a small amount of skew is detected, it is not necessary to search for large amounts, thereby slowing performance of the system.

Figure 9:
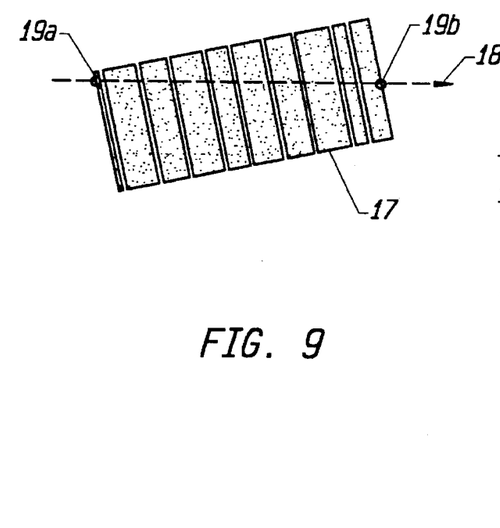
FIGS. 9 and 10 show skewing effects depending upon size of bar code.
Figure 10:
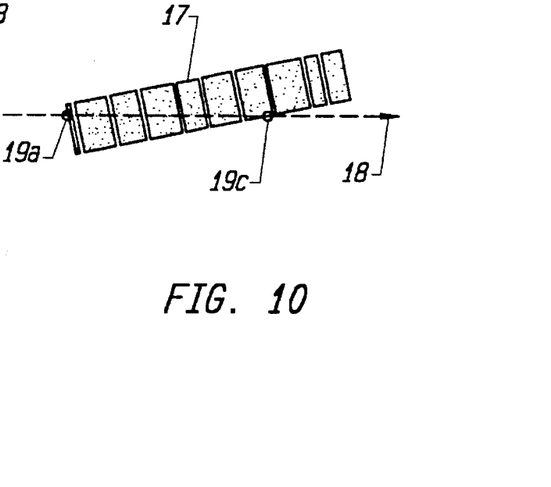

As shown in FIGS. 9 and 10 certain angles may be readable and others may not be readable. The dashed line 18 shown in FIG. 9 represents the default scanning path across bar code 17. The scanning path crosses every bar in the code on the in FIG. 10, intersecting the bar code at points 19a and 19b. In this example, the bar code can be read without adjusting the bar code to compensate for its initial skew. However, the dashed line 18 misses some of the bars in the bar code in FIG. 10 because the scan line 18 does not reach the second parallel edge of the bar code, but instead exits the bar code at point 19c. In this case, the skew of the bar code should be adjusted so that it can be read entirely.

Figure 11:
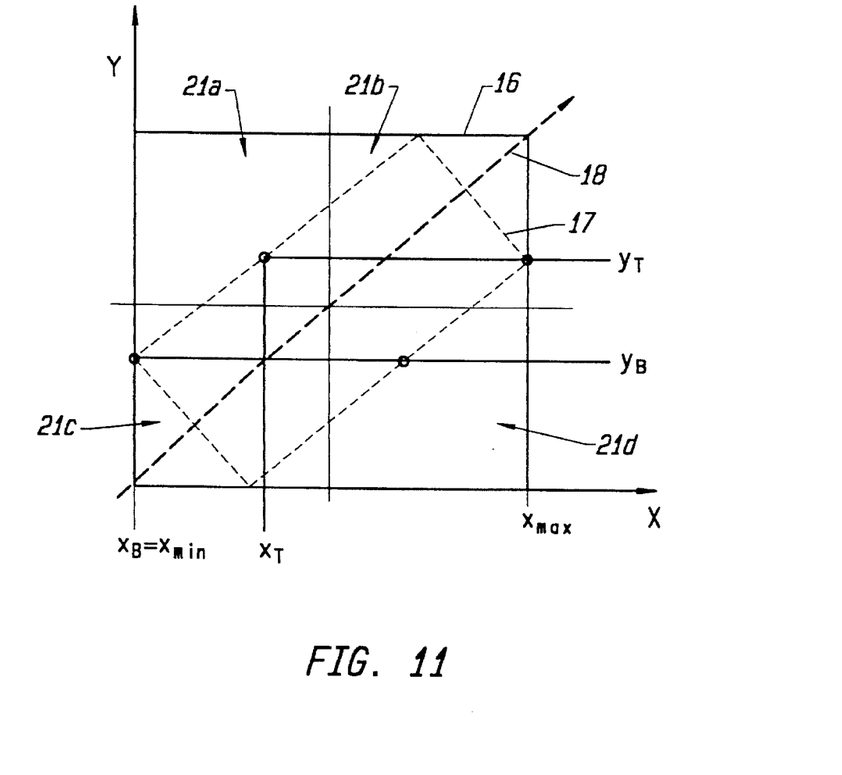
FIG. 11 shows is a graphic depiction of data manipulated in accordance with the present invention.

FIG. 11 shows an x-y plane representing the data of the bit map of a bar code used in the operations discussed below to generate deskewed results. Bar code 17 is surrounded by block 16 which is divided into quadrants, 21a, 21b, 21c and 21d. Each pixel in each quadrant is counted. To determine whether the skew is in the upward direction or the downward direction, the following inequalities are considered.

Upward when $21a+21d>21c+21b$; and downward when $21a+21d<21c+21b$.

The direction of the readline is preferably parallel to the central axis of the horizontal orientation of the bar code. Thus to find the readline, the slope of the bar code with respect a horizontal document is calculated. For illustrative purposes an x-y coordinate system is shown in FIG. 11. $Y_T$ is found at the maximum x value and $X_B$ is found at the minimum x value, for example. $Y_B$ and $X_T$ can be at the same point. Thus, by finding $Y_T-Y_B$ and $X_T-X_B$, that is dy/dx, the slope of the readline of the bar code is extrapolated. Once the slope is found, the bar code may be rotated to a horizontal direction for reading by known graphics programs or may be read along the skewed readline.

Referring to both FIGS. 3 and 8, after the search process, the bar code candidates are stored by step 34 in a computer store of computer 12. While a rectangle of a reasonable size is selected, a valid code has not necessarily been found. After the searching process a system according to the present invention is able to proceed to the reading process which includes the dynamic width determination process based on an auto discriminating function. The dynamic width determination feature of the present invention enables bar codes having low or varying quality to be read.

Figure 12:
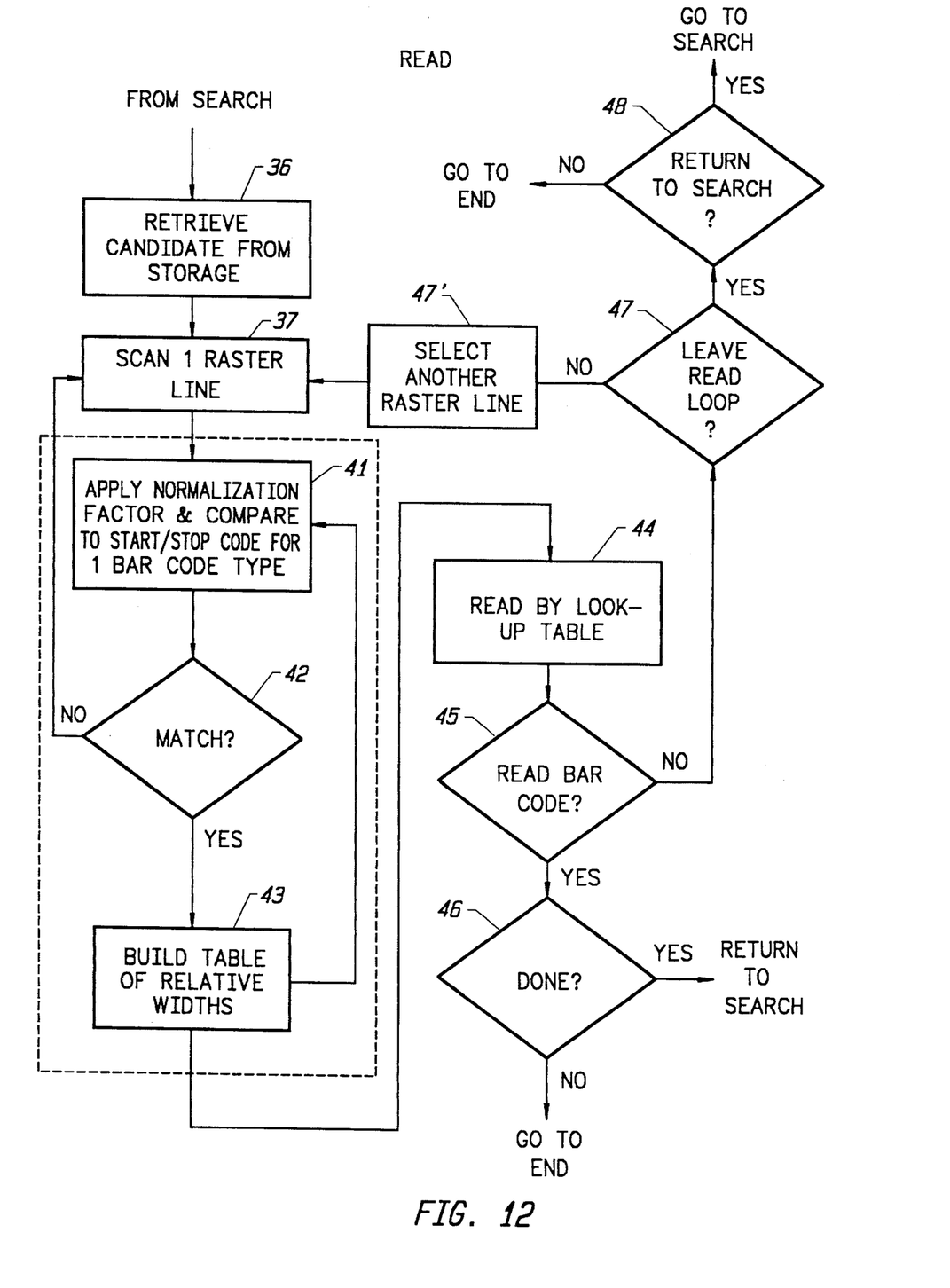
FIG. 12 is a flow chart of the read process of the present invention.

Referring now to FIGS. 3 and 12, the reading feature generally shown as step 2 and more specifically 36 of the present invention begins by retrieving from the candidate storage 37 a single bar code candidate. A first raster line is mapped or read at step 37. In step 37 one raster line is scanned so dynamic width determination analysis can take place. One raster line is then compared to the start code or first character for one particular bar code type. Thus to analyze the candidate with respect to a first type of bar code certain characters are analyzed. For example, as shown in FIG. 5, in 3 of 9 the first five bars of the code are examined. In FIG. 5, the first 5 bars are the start character, 39a and the last five bars are the stop character, 39b. Each character of a bar code is defined by its white pixel run lengths and its black pixel run lengths, such indicated where black bars 6 meet white spaces 5. Both the start character and the stop character should be considered in the event the bar code could have been turned upside down through processing.

By only looking at the first character of any type of bar code, the program run time is limited. Moreover, low level characteristics rules which are intrinsic to bar code can provide low level decisions, wherein 90% of the decisions can be made at the first compare at box 44. For example, a low level characteristic rule is a function of the number of wide bars verses narrow bars to create character by character parity.

Each code type has a very different dynamic search algorithm. This low level processing provides a smorgsborg of possible codes at a higher level. The lines in the selection process are compared and the most frequently occurring are tried first with the high level processing steps. Lines further down the frequency ladder are tried if the higher level processes are not successful. This process allows the bar codes to be read in a noisy environment where many of the bars are of a poor quality.

Successful bar code reading relies on the reading computer's ability to distinguish between bars and spaces, both of which (depending upon symbology) come in at least two, and sometimes as many as eight different widths. Accurately preserving these differences in widths through printing, reproduction, and scanning of the bar code symbol is essential to their reliable use. However, often, the bar and space widths have been compromised, rendering the bar code unreadable.

Thus, the present invention provides that, depending upon the readability of the bar code candidate, a number of raster lines may be read. Each time a raster line is analyzed, the present invention includes dynamic width determination in step 41.

As previously discussed, a bar code is defined by the widths or relative widths of the bars and spaces. The actual number of black or white pixels which constitute the width or relative width of a bar or space can be different within each character of a symbol because of scanning errors, printing error or even paper size changes. The number or bars and spaces used is particular to each symbology and a different table of relative widths is created for each symbology.

If the widths of black bars 6 and white spaces 5 do not conform to predetermined bar code parameters, their relative dimensions are dynamically determined in accordance with the present invention. By counting a sufficient number of white run lengths of the bar code candidate to satisfy the requirements of a specific bar code symbology, a normalization factor is provided. The relative white run lengths of the bar code candidate are then determined using the normalization factor.

As discussed above, the bar code candidate is read along a sufficient number of the lines of the bit map in a raster-like manner so that the white spaces and black can be analyzed. The bit count (representing dimensional values) of the bars and spaces is analyzed or manipulated according to predetermined dimensional parameters utilizing the generated normalization factor and is then compared to code for one bar code type at step 41. Their conformance to the predetermined parameters is checked in step 42. If they do not conform, step 41 is repeated for the same raster line. Several passes may be made. If a match is found or no match is found at step 42, the process is repeated for the next bar code type until all the types are exhausted.

Box 40 surrounding steps 41, 42 and 43 denotes the process for building a table of relative widths. Since the number of bars and spaces used is particular to each symbology, a different table of relative widths is created for each symbology.

Figure 13:
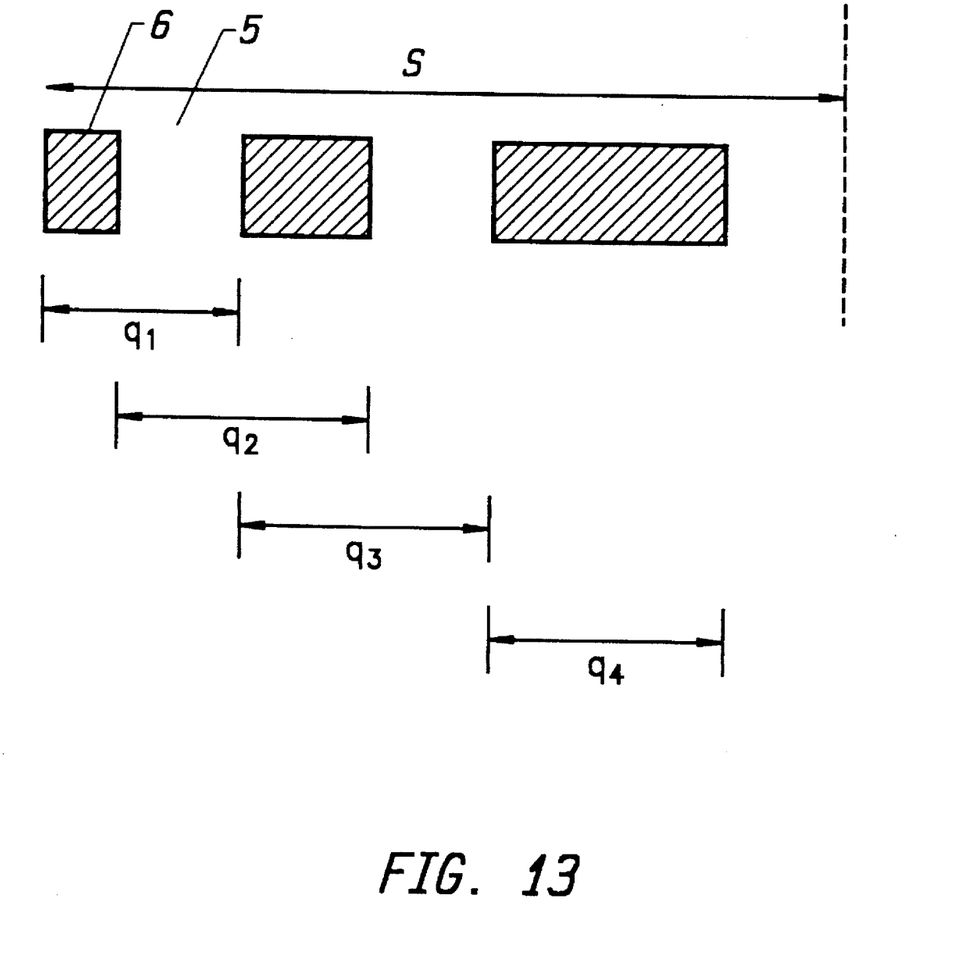
FIG. 13 shows a dimensional representation of the variables used in the dynamic determination of the bar code white space and black bar widths in accordance with the present invention.

FIG. 13 shows a dimensional representation of the variables used in the dynamic determination of the bar code white space and black bar widths in accordance with the present invention as used in step 41 and 43. The total width, S, is determined based on the symbology of the bar code type being processed. In the FIG. 13 example, the distance S is defined by the start of one black run to the start of a forth black run. This width definition varies from bar code symbology to bar code symbology. In this process, variable width equations are applied to characterize the image. The values for $q_1$, $q_2$, $q_3$ and $q_4$ for each character are converted into corresponding normalized values Q1 through Q4 according to the equations below. The normalized values represent integral multiples of a module width, such being a standard for that particular bar code type. The equations (which are applicable to USS-93) are as follows:

If $q_i<(2.5S)/9$, then Qi is declared as two modules, otherwise

If $q_i<(3.5S)/9$, then Qi is declared as three modules, otherwise

If $q_i<(4.5S)/9$, then Qi is declared as four modules, otherwise $q_i$ is declared as five modules.

When the four values Q1 through Q4 have been determined, a particular character for a certain type of bar code can be identified by matching the values in the table built in step 43 with a "look up" table data built in step 44.

The values of S and $q_i$ are defined by run lengths of black or white pixels on a binary bit map as opposed to previous interpretation of the values of S and $q_i$ as being time dimensions of signal transition points.

The data gathered in the proceeding steps can be stored so that the bar code data is resident in the computer's memory and is extrapolated therefrom to provide output data rather than actually reading the code. The read process is very simple since table of each code are maintained in the computer's memory. An interpolation process thus provides the final answer.

Each set of codes passed by the selection process is examined for higher order. In accordance therewith, the best results and fastest performance are achieved when bar code searches are optimized by supplying what is known about the target documents to the bar code reading application. In general, the more known about the location, orientation, symbology, number of characters per symbol, size and number of bar codes in your document, the faster that processing can occur.

Whether a bar code has been read is asked in step 45. If the answer is yes, at step 46 the a determination is made as to whether there are any more sizes of codes to search for in step 1 in accordance with the input parameters. If the answer is no, the bar code bit map data will be converted to decrypted output and the process will end. Otherwise the system returns to the search feature to repeat the process for different sized bar codes.

Referring to step 45, if a bar code is not read, according to step 47 either the read loop can be repeated at step 37, or a query about returning to the search loop is provided at step 48. At that point, either the process end or returns to the search feature of the present invention. If the answer is no to whether to leave the read loop, another raster line is selected at step 47' depending upon whether another raster line must be read to get satisfactory results. Ultimately a confidence factor analysis is performed to the determine whether or not to proceed with step 47'. The quality parameter is used in step 47' to continue selection of additional raster lines. The lower quality parameter the more raster lines will be visited by the candidate. A confidence factor is generated based on the number of raster lines visited before a bar code is read. The confidence value reflects the quality of the image and not the validity of the bar code read.

Means for providing the functions or carrying out many of the steps of the present invention, of course, are included elements shown in FIG. 1. The present invention provides for the integration of bar codes in the design of high-volume document capture systems with the express intent of dramatically lowering the labor content and therefore the ongoing cost of operating such a system. By including the features of locating the bar code on the document, aligning a skewed read-line, auto discriminating any type of bar code and dynamically adjusting the bit count to correspond to dimensional parameters. Human intervention in a bar code image capture system of the present invention is minimized. In accordance with the present invention higher throughput will and lower error rates are provided.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular purpose contemplated. It is intended that the scope of the invention be defined by the following claims and their equivalents.

I claim:

1. A method for reading a bar code on a document having a horizontal axis and having a bar code thereon, comprising the steps of:

providing a bit map of a scanned document having white bits and black bits;

detecting at least a portion of said black bits and white bits of said bit map by performing a smearing operation on said bit map to form blocks of black bits;

comparing said blocks with predetermined bar code criteria to determine whether any one of said blocks is a bar code candidate wherein said bar code candidate has a radial read line;

determining the magnitude of the skew of the bar code with respect to the horizontal axis of the document;

dividing said bit map into quadrants, counting the pixels in each of said quadrants and applying a set of inequalities to determine if the orientation of the skew is upward or downward; and reading said bar code bit map along said radial read line.

2. A method as recited in claim 1 wherein in said comparing step, said predetermined bar code criteria is size criteria for determining whether said bar code candidate exists on said bit map.

3. A method as recited in claim 1 wherein prior to said reading step, said method further includes the step of:

rotating said bar code bit map so that said radial read line and said horizontal axis are substantially parallel to one another.

4. A method as recited in claim 1 further comprising a read step, comprising the steps of:

comparing at least a portion of said bar code candidate with data from a bar code look-up table; and determining whether the characteristics of said bar code candidate match said bar code look-up table data.

5. A method as recited in claim 1 wherein said bar code candidate is a bit map made up of black and white bits, wherein a plurality of black bits together form a black run length and wherein a plurality of white bits together form a white bit run length, and wherein a sufficient number of run lengths is a quantity which is equivalent to predetermined criteria, said method further comprising the steps of:

counting said sufficient number of white run lengths and black run lengths of said bar code candidate to satisfy the requirements of a specific bar code symbology to provide a normalization factor; and determining relative white run lengths and black run lengths of said bar code candidate using said normalization factor.

6. A system for reading a bar code on a document having a horizontal axis and having a bar code thereon, comprising:

means for providing a bit map of a scanned document having white bits and black bits;

means for detecting at least a portion of said black bits and said white bits of said bit map by performing a smearing operation on said bit map to form blocks of black bits;

means for comparing said blocks with predetermined bar code criteria to determine whether any one of said data blocks is a bar code candidate wherein said bar code candidate has a radial read line;

means for determining the magnitude of the skew of the bar code with respect to the horizontal axis of the document;

means for dividing said bit map into quadrants, counting the pixels in each of said quadrants and applying a set of inequalities to determine if the orientation of the skew is upward or downward; and means for reading said bar code bit map along said radial read line.

7. A system as recited in claim 6 wherein said means for comparing includes comparing said bar code candidate with predetermined bar code size criteria for determining whether said bar code candidate exists on said bit map.

8. A system as recited in claim 6 further comprising:

means rotating said bar code bit map so that said radial read line and said horizontal axis are substantially parallel to one another.

9. A system as recited in claim 6 further comprising:

means for comparing at least a portion of said bar code candidate with data from a bar code look-up table; and means for determining whether the characteristics of said bar code candidate match said bar code look-up table data.

10. A system as recited in claim 6 further comprising:

means for counting the sufficient number of white run lengths of said bar code candidate to satisfy the requirements of a specific bar code symbology to provide a normalization factor; and means for determining relative white run lengths of said bar code candidate using said normalization factor.

11. A method of establishing the presence, position and skew of at least one bar code on a document having a horizontal axis, wherein the bar code, if present, is made up of a series of adjacent but spaced apart dark and light bars which together define a specific outer peripheral configuration, said method comprising the steps of:

(a) generating a bit map of the information on said document including a bar code that might be present;

(b) acting on said bit map in a way which detects one or more blocks of said information which are present and which corresponds in shape to the specific configuration or configurations of said bar code;

(c) analyzing said block or blocks of bit map information if present, to determine if any one thereof corresponds to a bar code;

(d) determining the magnitude of the skew of the bar code with respect to the horizontal axis of the document; and (e) dividing said bit map into quadrants, counting the pixels in each of said quadrant and applying a set of inequalities to determine if the orientation of the skew is upward or downward.

12. A method according to claim 11 wherein said step of acting on said bit map in a way which detects one or more blocks of said information which are present and which correspond in shape to the specific configuration or configurations of said bar code includes the step of performing a smearing operation in said single dimension on said bit map.

13. An apparatus for establishing the presence, position and skew of at least one bar code on a document, wherein the bar code, if present, is made up of a series of adjacent but spaced apart dark and light bars which together define a specific outer peripheral configuration, said method comprising the steps of:

(a) means for generating a bit map of the information including a bar code that might be present;

(b) means for acting on said bit map in a way which detects one or more blocks of said information which are present and which corresponds in shape to the specific configuration or configurations of said bar code;

(c) means for analyzing said block or blocks of bit map information, if present, to determine if any one thereof corresponds to a bar code; and (d) means for each bar code that is found, reading the information therefrom regardless of the orientation of such bar code with respect to the top edge of the document, said means including:

means for determining the magnitude of the skew of said bar code with respect to the top edge of the document; and means for determining whether the orientation of the skew with respect to the top edge of the document is upward or downward by:

dividing said block into quadrants;

counting the pixels in each of said quadrants; and applying a set of inequalities to determine if the orientation is upward or downward.

* * * * *